US009087518B2

(12) United States Patent
Narita

(10) Patent No.: US 9,087,518 B2
(45) Date of Patent: Jul. 21, 2015

(54) NOISE REMOVAL DEVICE AND NOISE REMOVAL PROGRAM

(75) Inventor: Tomohiro Narita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 427 days.

(21) Appl. No.: 13/515,895

(22) PCT Filed: Nov. 17, 2010

(86) PCT No.: PCT/JP2010/006751
§ 371 (c)(1),
(2), (4) Date: Jun. 14, 2012

(87) PCT Pub. No.: WO2011/077636
PCT Pub. Date: Jun. 30, 2011

(65) Prior Publication Data
US 2012/0250883 A1 Oct. 4, 2012

(30) Foreign Application Priority Data
Dec. 25, 2009 (JP) ................................ 2009-294828

(51) Int. Cl.
*H04B 15/00* (2006.01)
*G10L 21/0208* (2013.01)
*G10L 21/0232* (2013.01)

(52) U.S. Cl.
CPC ......... *G10L 21/0208* (2013.01); *G10L 21/0232* (2013.01)

(58) Field of Classification Search
CPC ............... H04R 3/005; H04R 2410/07; G10L 21/0208; G10L 2021/02165; G11B 20/24
USPC ........................................................ 381/94.1
See application file for complete search history.

(56) References Cited

U.S. PATENT DOCUMENTS 4,630,304 A * 12/1986 Borth et al. .................. 381/94.3
6,122,384 A * 9/2000 Mauro ......................... 381/94.3
7,206,418 B2 * 4/2007 Yang et al. ...................... 381/92
8,005,237 B2 * 8/2011 Tashev et al. ................... 381/92
8,364,479 B2 * 1/2013 Schmidt et al. ............... 704/228
2005/0203735 A1 9/2005 Ichikawa
2008/0167870 A1 * 7/2008 Hetherington et al. ....... 704/233
2008/0306734 A1 12/2008 Ichikawa

FOREIGN PATENT DOCUMENTS

JP 2005 257817 9/2005
JP 2010 220087 9/2010

OTHER PUBLICATIONS

Whipple, G., "Low Residual Noise Speech Enhancement Utilzing Time-Frequency Filtering," ICASSP94, Total 4 Pages, (1994).
International Search Report Issued Dec. 21, 2010 in PCT/JP10/06751 Filed Nov. 17, 2010.

* cited by examiner

*Primary Examiner* — Simon Sing
(74) *Attorney, Agent, or Firm* — Oblon, McClelland, Maier & Neustadt, L.L.P.

(57) ABSTRACT

A noise removal unit 102 executes noise removal and flooring processing of an input signal, and a density calculating unit 104 calculates, as to a point of interest on a time-frequency plane of the input signal passing through the noise removal, a density of non-flooring processing points from the presence or absence of the flooring processing of individual points around the point of interest. A partial suppression unit 105 replaces, when the density is less than a threshold, the power of the point of interest with its flooring value by considering it as a musical noise component, thereby suppressing the musical noise component.

20 Claims, 18 Drawing Sheets

FIG.15

| Global SNR Estimate | Threshold $TH_D$ |
|---|---|
| Less than 0 | 130 |
| Not Less than 0 to Less than 10 | 100 |
| Not Less than 10 to Less than 20 | 50 |
| Not Less than 20 | -1 |

FIG.18

| Global SNR Estimate | Neighborhood Number L | Weight Function $w(l_t,l_f)$ | Threshold $TH_D$ |
|---|---|---|---|
| Less than 0 | 4 | $w(l_t,l_f)=1$ | 20 |
| Not Less than 0 to Less than 10 | 4 | $w(l_t,l_f)=1$ | 10 |
| Not Less than 10 to Less than 20 | 3 | $w(l_t,l_f)=2\hat{}(2L-dis(l_t,l_f))$<br>※dis is Urban Distance from Center Point | 100 |
| Not Less than 20 | 3 | $w(l_t,l_f)=2\hat{}(2L-dis(l_t,l_f))$<br>※dis is Urban Distance from Center Point | -1 |

NOISE REMOVAL DEVICE AND NOISE REMOVAL PROGRAM

TECHNICAL FIELD

The present invention relates to a noise removal device and its program for eliminating musical noise remaining after noise removal.

BACKGROUND ART

Voice recognition processing and hands-free telephone conversation have a problem in that voice recognition performance and articulation will deteriorate because of noise superposed on voice. To solve the problem, various noise removal methods have been proposed. As the most common method, a spectral subtraction algorithm (referred to as "SS algorithm" from now on) has been known. The SS algorithm estimates a noise spectrum from a non-voice section where no voice is present in a voice signal and carries out noise removal by subtracting the estimated noise spectrum from a spectrum of any given frame of the voice signal. However, when there is an error between the estimated noise spectrum and actual noise spectrum superposed on the voice signal, over-subtraction and under-subtraction can occur depending on noise frequency. Although backfilling is made by flooring processing for the over-subtraction, a component of the under-subtraction remains as it is. The component of the under-subtraction is perceived as artificial sounds called musical noise, which results in deterioration in the recognition performance and articulation.

To reduce the musical noise, the following three measures can be conceived.

(1) Reducing the under-subtraction component by increasing a subtracting coefficient.

(2) Improving estimate accuracy of the noise spectrum to reduce subtraction residual error.

(3) Estimating and suppressing the under-subtraction component after subtraction.

As for the foregoing approach (1), since the noise is subtracted greatly even in a voice section, the voice spectrum undergoes distortion, which has an adverse effect on the voice recognition performance. As for the foregoing approach (2), although various methods have been proposed, the noise superposed on a frame is basically unknown and the error cannot be made zero. As for the foregoing approach (3), a conventional method is known which calculates a power ratio of regions near a point of interest on a time-frequency plane and eliminates a musical noise component (see Non-Patent Document 1, for example). More specifically, it calculates cumulative power A of a region enclosed by a distance N from the point of interest on the time-frequency plane and cumulative power B of a region enclosed by a distance M (N<M), considers, when $(A-B)\times\alpha<B$, the region enclosed by the distance N from the point of interest as a musical noise component, and eliminates the musical noise component by making its power zero.

PRIOR ART DOCUMENT

Non-Patent Document

Non-Patent Document 1: Gary Whipple, "Low Residual Noise Speech Enhancement Utilizing Time-Frequency Filtering", ICASSP94, 1994.

DISCLOSURE OF THE INVENTION

With the foregoing configuration, the conventional musical noise eliminating method has a problem in that when power fluctuations of the noise is large and hence power fluctuations of the under-subtraction component is large, an estimate error of the noise spectrum occurs, and as a result, the musical noise component is left as it is without being eliminated, or a point to be considered as the voice component is eliminated as the musical noise component.

In addition, after eliminating the musical noise component, since the power in the region near the point of interest becomes zero, a problem occurs in that temporal discontinuity occurs.

The present invention is implemented to solve the foregoing problems. Therefore it is an object of the present invention to suppress the musical noise component by appropriately discriminating it even when the power fluctuations of noise are large and hence the power fluctuations of the under-subtraction component also are large, and to avoid the temporal discontinuity by suppressing the musical noise component using a flooring value.

A noise removal device in accordance with the present invention comprises: a noise estimating unit for estimating noise superposed on an input signal; a noise removal unit for eliminating the noise superposed on the input signal and for executing flooring processing by using statistics of the noise the noise estimating unit estimates; a density calculating unit for calculating, with respect to a point of interest on a time-frequency plane of the input signal from which the noise is removed, a designated density of individual points around the point of interest; and a partial suppression unit for replacing, when the density of the point of interest on the time-frequency plane is less than a threshold, the power of the point of interest with a flooring value the noise removal unit uses in the flooring processing.

A noise removal program in accordance with the present invention causes a computer to function as: a noise estimating step of estimating noise superposed on an input signal; a noise removal step of eliminating the noise superposed on the input signal and for executing flooring processing by using statistics of the noise the noise estimating step estimates; a density calculating step of calculating, with respect to a point of interest on a time-frequency plane of the input signal from which the noise is removed, a designated density of individual points around the point of interest; and a partial suppression step of replacing, when the density of the point of interest on the time-frequency plane is less than a threshold, the power of the point of interest with a flooring value the noise removal step uses in the flooring processing.

According to the present invention, since it is configured in such a manner as to calculate, with respect to the point of interest on the time-frequency plane of the input signal from which the noise is removed, the designated density of the individual points around the point of interest, and to replace, when the density is less than the threshold, the power of the point of interest with the flooring value, it can appropriately discriminate and suppress the musical noise component even if the power fluctuations of noise is large and hence the power fluctuations of an under-subtraction component is large. In addition, since it suppresses the musical noise component using the flooring value, it can prevent temporal discontinuity from occurring.

BRIEF DESCRIPTION OF THE DRAWINGS

FIG. 15 is a diagram showing a global SNR-threshold correspondence table stored in the threshold memory 109 shown in FIG. 13;

FIG. 18 is a diagram showing a global SNR-neighborhood number-weight function-threshold correspondence table stored in the weight function memory 111 shown in FIG. 16.

EMBODIMENTS FOR CARRYING OUT THE INVENTION

The best mode for carrying out the invention will now be described with reference to the accompanying drawings to explain the present invention in more detail.

Embodiment 1

Figure 1:
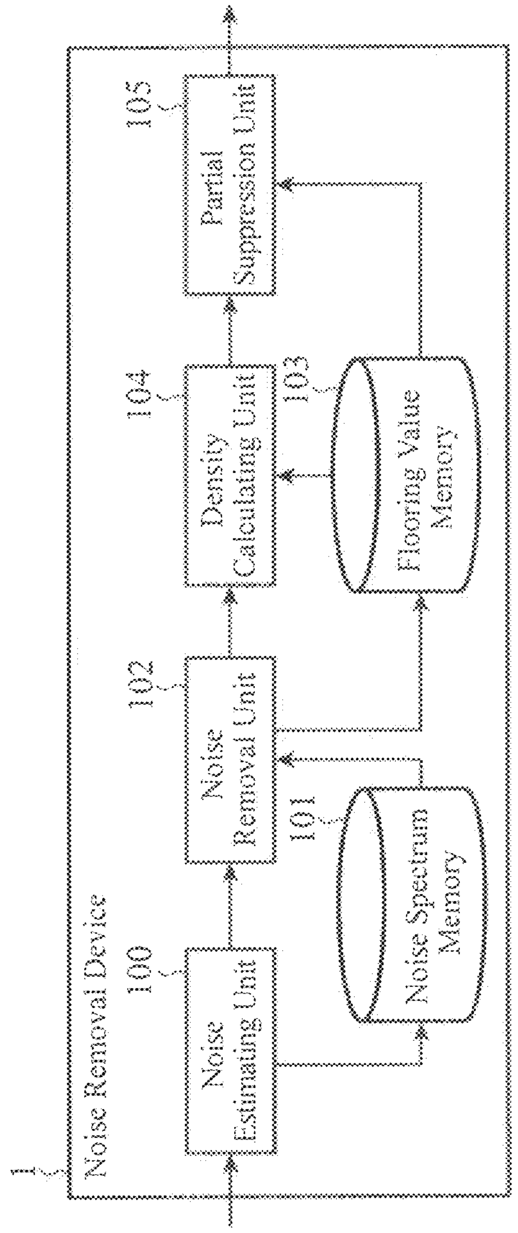
FIG. 1 is a block diagram showing a configuration of a noise removal device of an embodiment 1 in accordance with the present invention.

FIG. 1 is a block diagram showing a configuration of a noise removal device 1 of an embodiment 1 in accordance with the present invention. In FIG. 1, the noise removal device 1, which is a device for eliminating noise superposed on an input signal and for eliminating a musical noise component remaining after eliminating the noise, comprises a noise estimating unit 100, a noise spectrum memory 101, a noise removal unit 102, a flooring value memory 103, a density calculating unit 104, and a partial suppression unit 105.

The noise estimating unit 100 estimates a noise spectrum superposed on the input signal, calculates statistics of the estimated noise spectrum and updates them, and supplies to the noise spectrum memory 101. The noise spectrum memory 101 is a storage for storing the statistics of the estimated noise spectrum supplied from the noise estimating unit 100. The noise removal unit 102 acquires the statistics of the estimated noise spectrum from the noise spectrum memory 101, subtracts from the spectrum of the input signal, carries out flooring processing for preventing excessive subtraction, and supplies a flooring value and the presence or absence of the flooring processing for each time-frequency to the flooring value memory 103.

The density calculating unit 104 acquires and binarizes information about the presence or absence of the flooring for each time-frequency from the flooring value memory 103, calculates the density of the point of interest on the time-frequency plane (spectrogram) by obtaining a product sum with the weight function, and supplies the density to the partial suppression unit 105. The partial suppression unit 105 compares the density supplied from the density calculating unit 104 with a threshold, and replaces the power of the point of interest less than the threshold by the flooring value the flooring value memory 103 stores, thereby suppressing the musical noise component.

As for a voice part and a non-voice part in the input signal, since the frequency of occurrence of the flooring in the surrounding grid of the point of interest differ significantly, it is possible to calculate the density of the non-flooring processing points in the surrounding grid, and to discriminate the point of interest less than the threshold as the musical noise component.

Incidentally, the noise removal device 1 can be configured as hardware consisting of the noise estimating unit 100, noise spectrum memory 101, noise removal unit 102, flooring value memory 103, density calculating unit 104 and partial suppression unit 105 arranged as a dedicated circuit each, or can be configured as a combination of a control circuit consisting of a general-purpose CPU (Central Processing Unit) or the like with a computer program. When constructing the noise removal device 1 from a computer, it is enough that a noise removal program describing the processing contents of the noise estimating unit 100, noise spectrum memory 101, noise removal unit 102, flooring value memory 103, density calculating unit 104 and partial suppression unit 105 is stored in a memory of the computer, and the control circuit such as a general-purpose CPU of the computer executes the noise removal program stored in the memory.

Furthermore, it goes without saying that a change of design and the like within the scope of the substance of the present invention is included in the present invention.

Next, the operation of the noise removal device 1 will be described.

Figure 2:
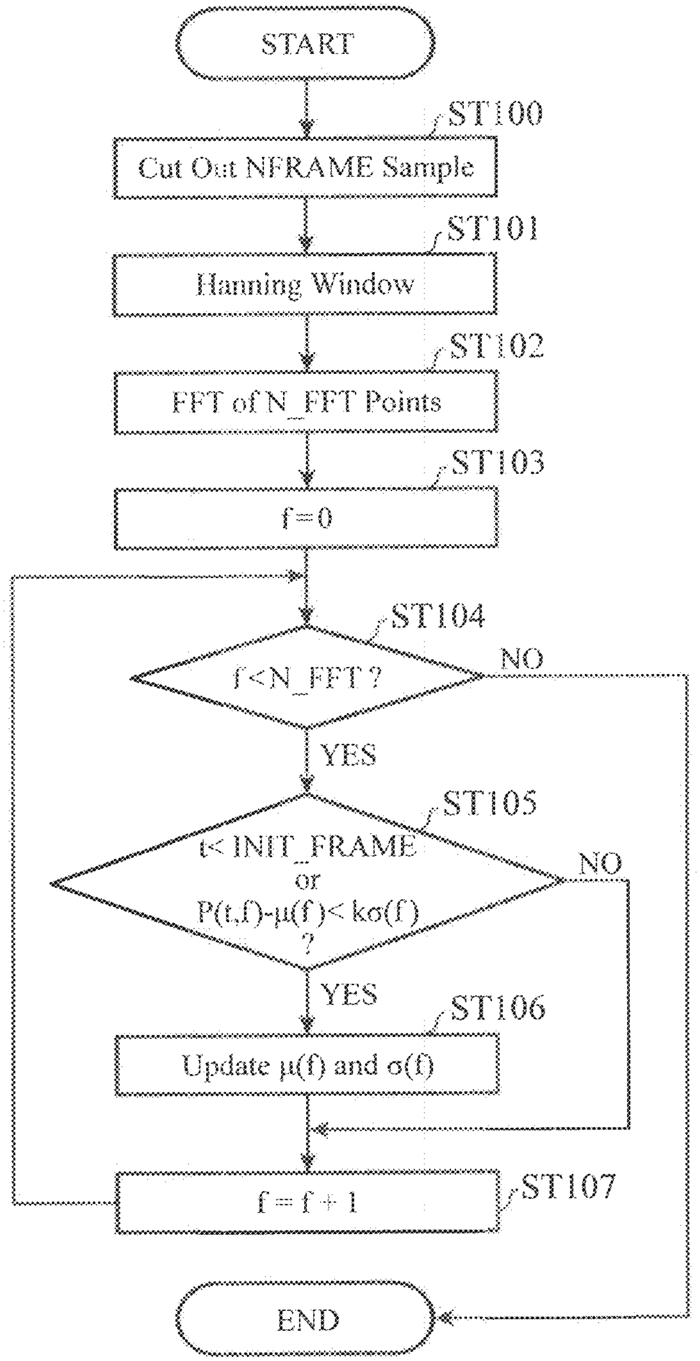
FIG. 2 is a flowchart showing the operation of the noise estimating unit 100 shown in FIG. 1.

First, the operation of the noise estimating unit 100 will be described. FIG. 2 is a flowchart showing the operation of the noise estimating unit 100 shown in FIG. 1. The noise estimating unit 100 calculates the mean value μ(f) and standard deviation σ(f) of the estimated noise spectrum with a frequency number f in the following procedure.

First, the noise estimating unit 100 cuts out frames with a sample frame number NFRAME from the input signal as a sample (step ST100). Subsequently, the noise estimating unit 100 applies a windowing function such as a Hanning window to the cut-out N frames (step ST101), and carries out an FFT (Fast Fourier Transform) with the number of points of N_FFT (step ST102).

Subsequently, the noise estimating unit 100 sets the frequency number f at zero (step ST103), and compares the frequency number f with the number of FFT points N_FFT (step ST104). If the frequency number f is less than the number of FFT points N_FFT ("YES" at step ST104), the processing proceeds to step ST105, otherwise ("NO" at step ST104) the processing is terminated.

Subsequently, if the frame number t is less than the initialized frame number INIT_FRAME or if the condition of the following Expression (1) is satisfied at step ST105 ("YES" at step ST105), the noise estimating unit 100 proceeds to step ST106, otherwise ("NO" at step ST105) it proceeds to step ST107.

$$P(t,f)-\mu(f)<k\sigma(f) \quad (1)$$

where P(t,f) is the power spectrum of the frequency number f of the frame number t, and k is an update parameter. When the value k is large, trackability for noise fluctuations increases, and when the value k is small, the trackability for noise fluctuations becomes small.

Incidentally, the initialized frame number INIT_FRAME is the frame number for learning the initial values of the mean value μ(f) and standard deviation σ(f). When the foregoing Expression (1) is satisfied, although the noise estimating unit 100 updates the mean value μ(f) and standard deviation σ(f) successively as will be described below, it must learn the initial values of the mean value μ(f) and standard deviation σ(f) using a certain number of frames.

When used for the purpose of voice recognition and telephone conversation, since there is a speech pause section of some extent from the start of the noise removal device 1 to actual utterance, the initial learning becomes possible by setting the initialized frame number INIT_FRAME at an appropriate value.

Subsequently, the noise estimating unit 100 updates the mean value μ(f) and standard deviation σ(f) according to the following Expressions (2)-(8) at step ST106.

$$SUM1(f) = SUM1(f) - P(\text{oldest}, f) \quad (2)$$

$$\text{if } cnt(f) > BUFSIZE$$

$$SUM2(f) = SUM2(f) - P(\text{oldest}, f)^2 \quad (3)$$

$$\text{if } cnt(f) > BUFSIZE$$

$$SUM1(f) = SUM1(f) + P(t, f) \quad (4)$$

$$SUM2(f) = SUM2(f) + P(t, f)^2 \quad (5)$$

$$\mu(f) = \frac{SUM1(f)}{\min(cnt(f), BUFSIZE)} \quad (6)$$

$$\sigma(f) = \sqrt{\frac{SUM2(f)}{\min(cnt(f), BUFSIZE)} - \mu(f)^2} \quad (7)$$

$$cnt(f) = cnt(f) + 1 \quad (8)$$

where SUM1(f) and SUM2(f) are a buffer used for addition for the frequency number f, BUFSIZE is the number of frames for calculating the statistics, cnt(f) is a counter for the frequency number f, and oldest represents the oldest frame number t added in the buffers used for addition.

Subsequently, the noise estimating unit 100 increments the frequency number f by one at step ST107, returns to step ST104, again, and executes the processing with the next frequency number f.

Through the foregoing processing, the noise estimating unit 100 calculates the mean value μ(f) and standard deviation σ(f), which are the statistics of the estimated noise spectrum, and causes the noise spectrum memory 101 to store these values.

Figure 3:
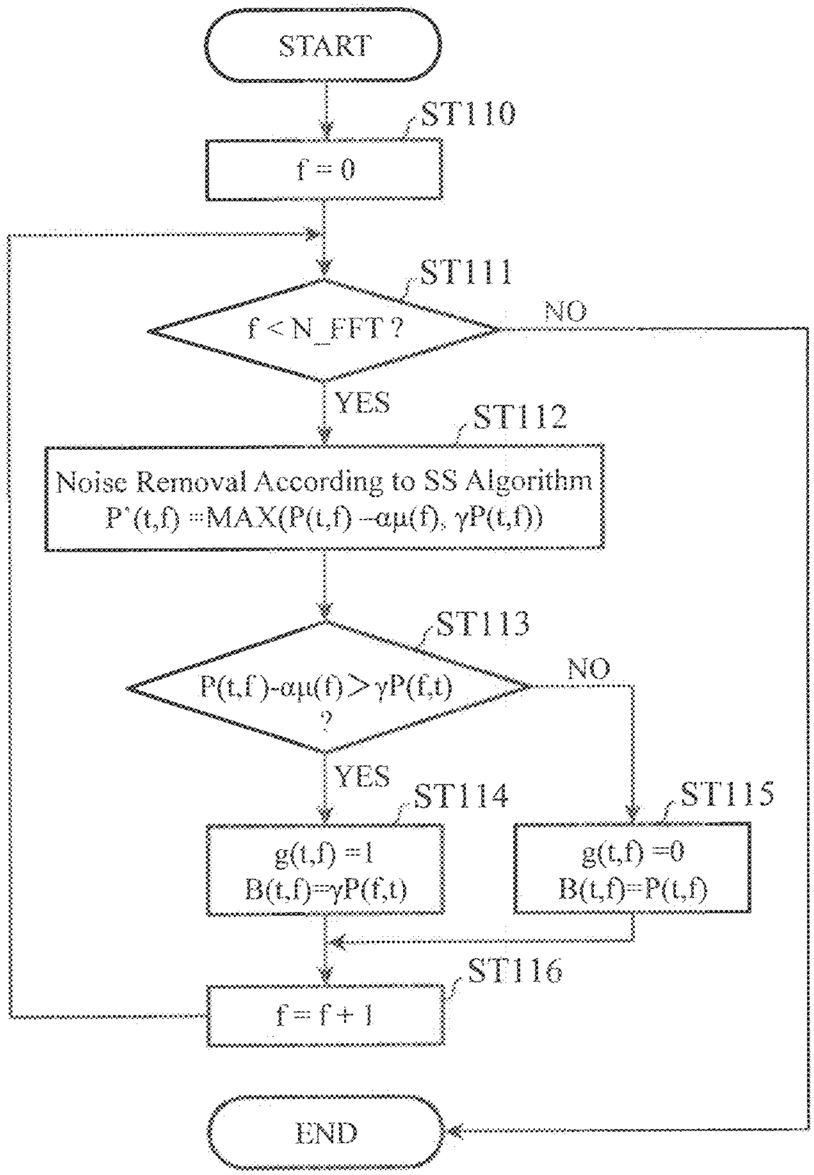
FIG. 3 is a flowchart showing the operation of the noise removal unit 102 shown in FIG. 1.

Next, the operation of the noise removal unit 102 will be described. FIG. 3 is a flowchart showing the operation of the noise removal unit 102 shown in FIG. 1. The noise removal unit 102 acquires the mean value μ(f) and standard deviation σ(f) from the noise spectrum memory 101, and removes the noise from the input signal through the following procedure.

First, the noise removal unit 102 sets the frequency number f at zero (step ST110), and compares the frequency number f with the number of FFT points N_FFT (step ST111). When the frequency number f is less than the number of FFT points N_FFT ("YES" at step ST111), the processing proceeds to step ST112, otherwise ("NO" at step ST111) the processing is terminated.

Subsequently, the noise removal unit 102 eliminates noise using the SS algorithm at step ST112, that is, removes stationary noise from the input signal according to the following Expression (9) and backfills the over-subtraction using the flooring processing. P'(t,f) is the power spectrum of the input signal from which the stationary noise is removed.

$$P'(t,f)=\text{MAX}(P(t,f)-\alpha\mu(f),\gamma P(t,f)) \quad (9)$$

where α is a subtraction coefficient for designating by what factor the estimated noise spectrum should be multiplied when subtracted from the spectrum of the input signal, and γ is a flooring coefficient for preventing excessive subtraction (that is, over-subtraction).

Subsequently, if the condition of the following Expression (10) is satisfied at step ST113, that is, if the flooring does not occur in the spectrum after removing the stationary noise ("YES" at step ST113), the noise removal unit 102 proceeds to step ST114, otherwise ("NO" at step ST113) it proceeds to step ST115.

$$P(t,f)-\alpha\mu(f)>\gamma P(t,f) \quad (10)$$

When the flooring does not occur, the noise removal unit 102 substitutes values into the non-flooring flag g(t,f) and into the backup B(t,f) of the flooring value according to the following Expressions (11) and (12) at step ST114.

$$g(t,f)=1 \quad (11)$$

$$B(t,f)=\gamma P(t,f) \quad (12)$$

On the other hand, when the flooring occurs, the noise removal unit 102 substitutes values into the non-flooring flag g(t,f) and into the backup B(t,f) of the flooring value according to the following Expressions (13) and (14) at step ST115.

$$g(t,f)=0 \quad (13)$$

$$B(t,f)=P(t,f) \quad (14)$$

Subsequently, the noise removal unit 102 increments the frequency number f by one at step ST116, returns to step ST111 again, and executes the processing of the next frequency number f.

Through the foregoing processing, the noise removal unit 102 eliminates the noise superposed on the input signal and backfills the over-subtraction component through the flooring processing. Furthermore, to suppress the musical noise component which is the under-subtraction component, it causes the flooring value memory 103 to store the backup B(t,f) of the flooring value which is the flooring value at the noise removal and the non-flooring flag g(t,f) indicating the presence or absence of the flooring.

Figure 4:
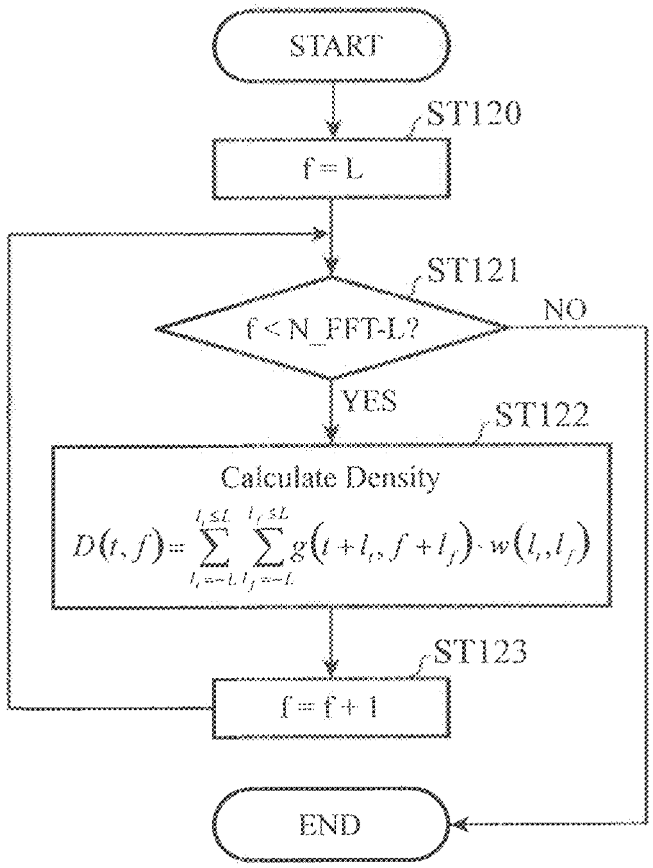
FIG. 4 is a flowchart showing the operation of the density calculating unit 104 shown in FIG. 1.

Next, the operation of the density calculating unit 104 will be described. FIG. 4 is a flowchart showing the operation of the density calculating unit 104 shown in FIG. 1. The density calculating unit 104 acquires the non-flooring flag g(t,f) from the flooring value memory 103, and calculates the density through the following procedure.

First, the density calculating unit 104 sets the frequency number f at a neighborhood number L that represents the size of the grid used for the density calculation (step ST120), and compares the frequency number f with a variable (N_FFT−L) obtained by subtracting the neighborhood number L from the number of FFT points (step ST121). If the frequency number f is less than the variable (N_FFT−L) ("YES" at step ST121), the processing proceeds to step ST122, otherwise ("NO" at step ST121) the processing is terminated.

Subsequently, the density calculating unit 104 calculates the density D(t,f) from the non-flooring flag g(t,f) according to the following Expression (15) at step ST122.

$$D(t,f)=\sum_{l_t=-L}^{l_t\le L}\sum_{l_f=-L}^{l_f\le L} g(t+l_t,f+l_f)\cdot w(l_t,l_f) \qquad (15)$$

where $w(l_t,l_f)$ is a weight function for the density calculation, L is the neighborhood number, and $l_t$ and $l_f$ are an index indicating a position from the center point (that is, the point of interest). Details of the weight function will be described later.

Subsequently, the density calculating unit 104 increments the frequency number f by one at step ST123, returns to step ST121 again, and executes the processing of the next frequency number f.

Through the foregoing processing, the density calculating unit 104 calculates the density D(t,f) and supplies it to the partial suppression unit 105.

Figure 5:
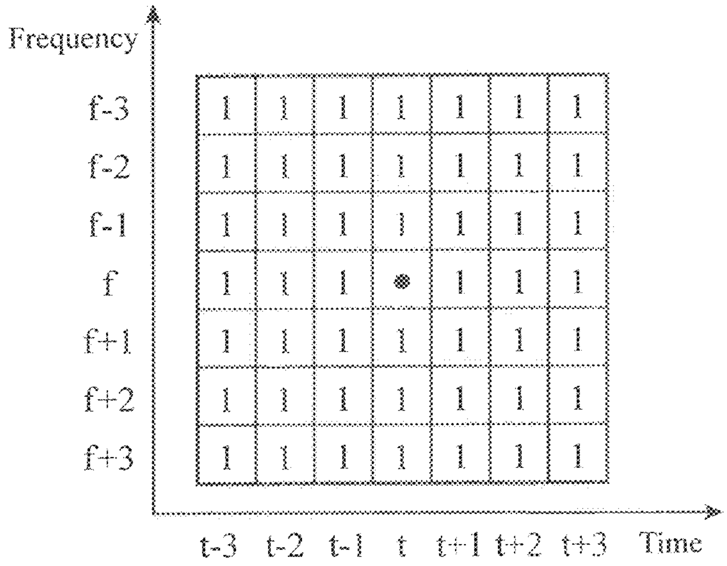
FIG. 5 is a diagram illustrating a weight function used for density calculation of the density calculating unit 104 shown in FIG. 1.

As the weight function, various functions are applicable depending on purposes or operating environments. FIG. 5 is a diagram showing weight of each point within the grid when the neighborhood number L=3 and the weight function $w(l_t, l_f)=1$. The case is equivalent to the case where the number of points that are not subjected to the flooring within the grid of (2L+1)×(2L+1) whose center is the point of interest (t, f) (solid circle in FIG. 5) is counted, and is considered to be the simplest weight function.

Figure 6:
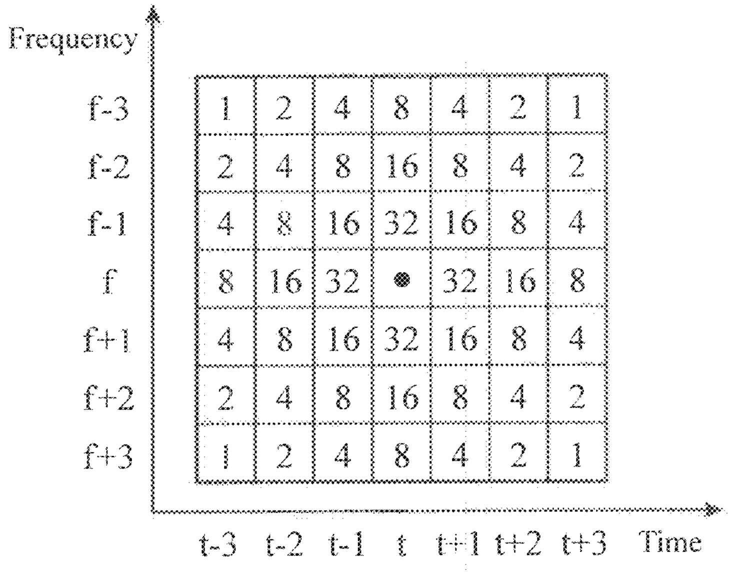
FIG. 6 is a diagram illustrating a weight function used for density calculation of the density calculating unit 104 shown in FIG. 1, in which case the weight function which differs from that of FIG. 5 is used.

On the other hand, FIG. 6 is a diagram showing the weight of each point in the grid when the neighborhood number L=3 and the weight function $w(l_t, l_f)$ is given by the following Expression (16). Here, dis is the urban distance from the point of interest (t,f) (solid circle in FIG. 6) at the center of the grid. In the case shown in FIG. 6, since the weight increases as the distance from the point of interest reduces, even if the number of points that are not subjected to the flooring in the grid with (2L+1)×(2L+1) is the same, if these points center round the point of interest, it offers an advantage of increasing the density.

$$w(l_t,l_f)=2\hat{}(2L=dis(l_t,l_f)) \qquad (16)$$

Figure 7:
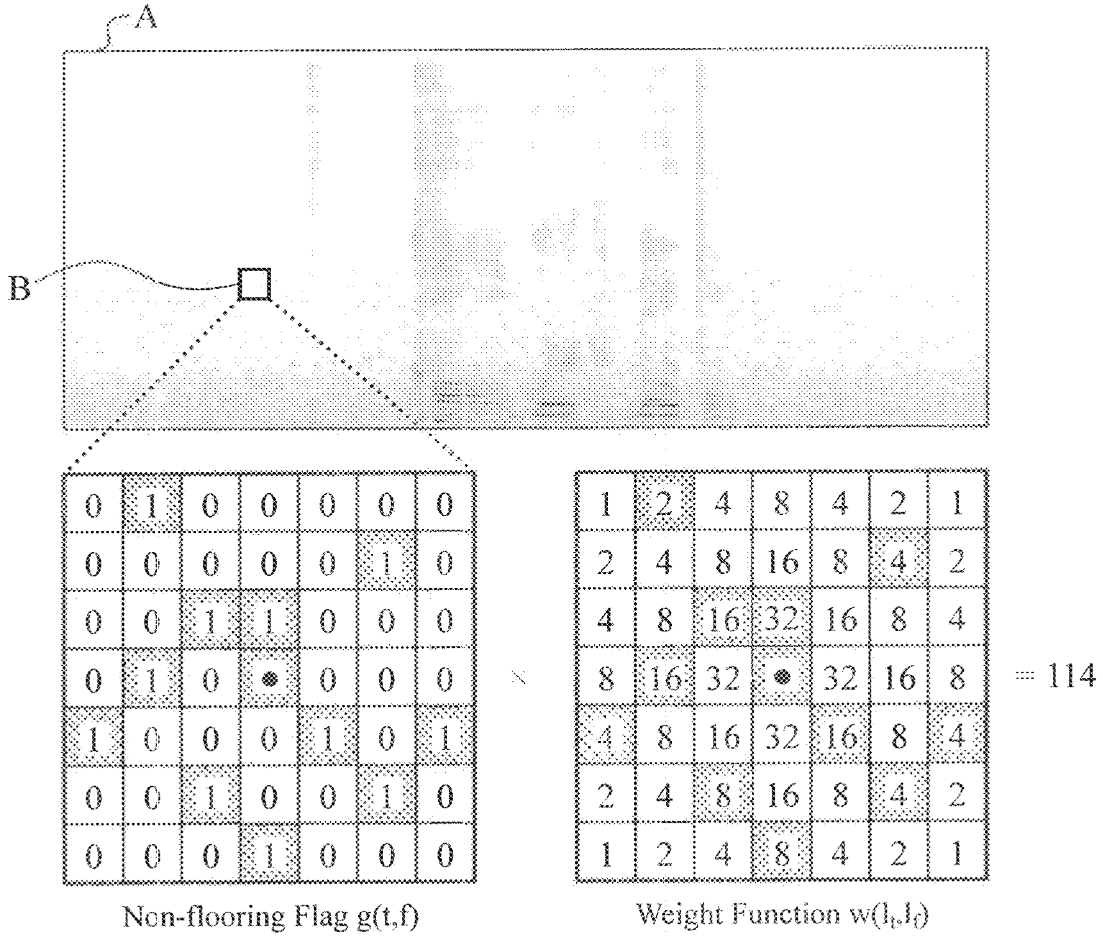
FIG. 7 is a diagram showing a concrete example of the density calculation by the density calculating unit 104 shown in FIG. 1.

FIG. 7 is a diagram showing a concrete example of the density calculation by the density calculating unit 104. In FIG. 7, a grid B with a size (2L+1)×(2L+1) whose center is the point of interest (solid circle in FIG. 7) is cut out from the time-frequency plane (spectrogram) A, and values of the non-flooring flags g(t,f) of the individual points in the grid B are arranged, and are binarizes in terms of 0 and 1. Then, the non-flooring flags g(t,f) of the individual points are multiplied by the weight function $w(l_t,l_f)$, and their sum becomes the density D(t,f)=114.

Figure 8:
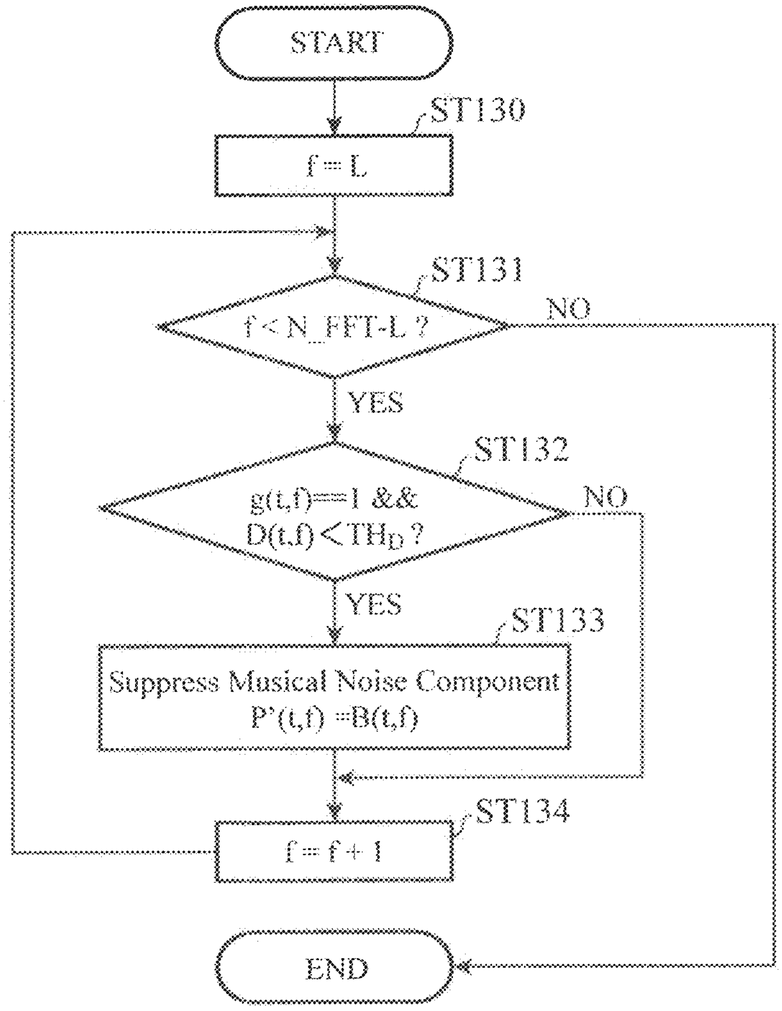
FIG. 8 is a flowchart showing the operation of the partial suppression unit 105 shown in FIG. 1.

Next, the operation of the partial suppression unit 105 will be described. FIG. 8 is a flowchart showing the operation of the partial suppression unit 105 shown in FIG. 1. The partial suppression unit 105 acquires the non-flooring flags g(t,f) and the backup values B(t,f) of the flooring values from the flooring value memory 103 and the densities D(t,f) supplied from the density calculating unit 104, and suppresses the musical noise components of the input signal from which the stationary noise is eliminated by the noise removal unit 102 through the following procedure.

First, the partial suppression unit 105 sets the frequency number f at the neighborhood number L (step ST130), and compares the frequency number f with the variable (N_FFT−L) (step ST131). If the frequency number f is less than the variable (N_FFT−L) ("YES" at step ST131), the processing proceeds to step ST132, otherwise ("NO" at step ST131), the processing is terminated.

Subsequently, if the non-flooring flag g(t,f) is 1 and the density D(t,f) is less than the threshold $TH_D$ at step ST132 ("YES" at step ST132), the partial suppression unit 105 decides that the power spectrum P'(t,f) of the input signal after the stationary noise removal is a musical noise component, and proceeds to step ST133, otherwise ("NO" at step ST132) proceeds to step ST134.

If the non-flooring flag g(t,f) is 1 and the density D(t,f) is less than the threshold $TH_D$, the partial suppression unit 105 substitutes the backup value B(t,f) of the flooring value for the power spectrum P'(t,f) at step ST133.

Subsequently, the partial suppression unit 105 increments the frequency number f by one at step ST134, returns to step ST131 again, and executes the processing of the next frequency number f.

Figure 9:
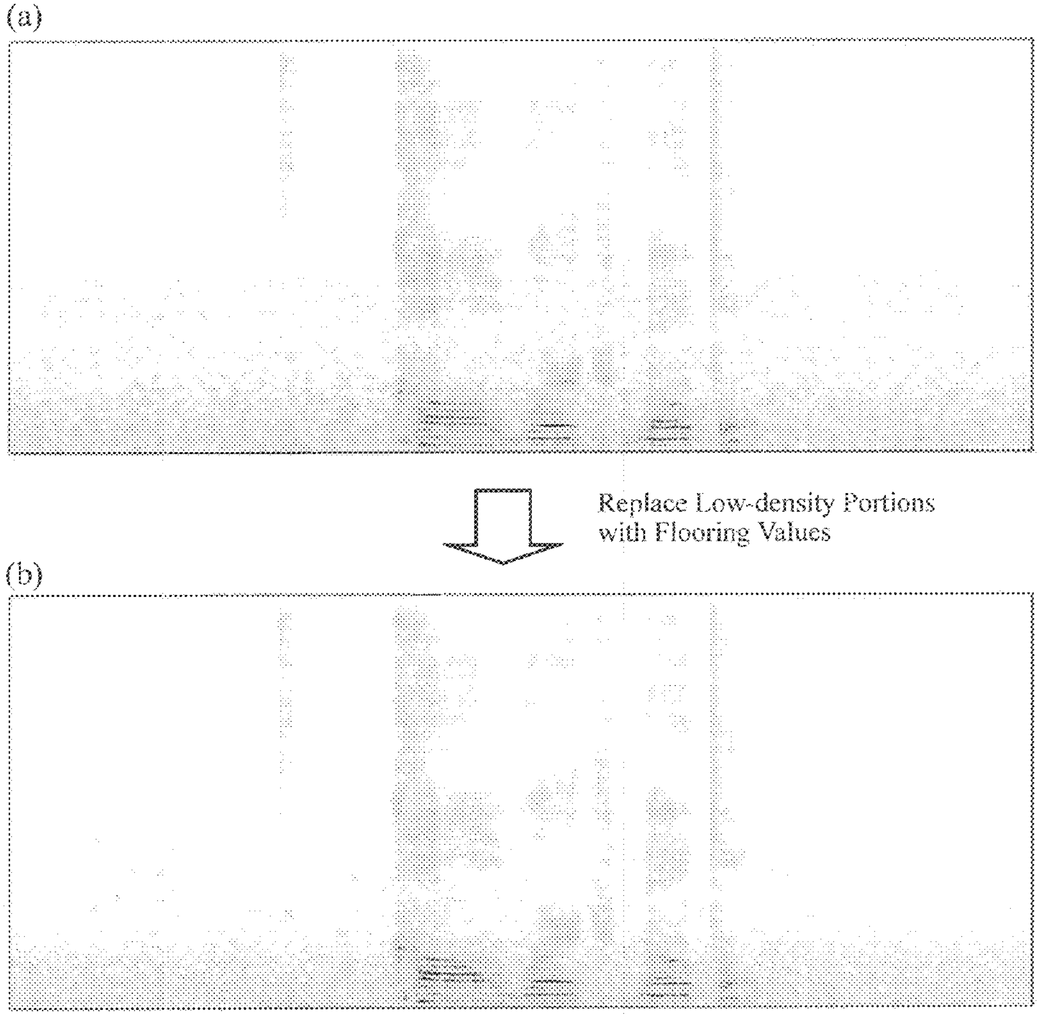
FIG. 9 is a diagram showing a concrete example of partial suppression processing by the partial suppression unit 105 shown in FIG. 1, in which FIG. 9(*a*) shows a spectrogram before the partial suppression processing and FIG. 9(*b*) shows a spectrogram after the partial suppression processing.

FIG. 9 is a diagram showing a concrete example of the partial suppression processing of the partial suppression unit 105: FIG. 9(*a*) is a spectrogram before the partial suppression processing; and FIG. 9(*b*) is a spectrogram after the partial suppression processing. In this way, it binarizes the power spectrum P'(t,f) after the noise removal according to the presence or absence of the flooring, calculates the density of the flooring executed points in the neighborhood of the point of interest, and forces the point of interest with a low density to be subjected to the flooring as the musical noise component. Thus, it is found that the components of the musical noise are suppressed as shown in FIG. 9(*b*).

Through the foregoing processing, the partial suppression unit 105 suppresses the musical noise component.

As described above, according to the embodiment 1, the noise removal device 1 is configured in such a manner as to comprise the noise estimating unit 100 for estimating the noise superposed on the input signal, the noise spectrum memory 101 for storing statistics of the noise, the noise removal unit 102 for eliminating the noise superposed on the input signal using the statistics of the noise and for executing the flooring processing, the flooring value memory 103 for storing the flooring value for each time-frequency and the flag indicating the presence or absence of the flooring processing, the density calculating unit 104 for calculating, with respect to the point of interest on the time-frequency plane of the input signal from which the noise is removed, the density of the non-flooring processing points from the flag indicating the presence or absence of the flooring processing of each point around the point of interest, and the partial suppression unit 105 for substituting, when the density of the point of interest is less than the threshold, the flooring value for the power of the point of interest. Accordingly, compared with the conventional method and the like, it can discriminate the musical noise component and suppress it appropriately even if the power fluctuations of noise are large and hence the power fluctuations of the under-subtraction component are large. In addition, by suppressing the musical noise component using the flooring values, it can prevent the temporal discontinuity from occurring in the signal.

Embodiment 2

Figure 10:
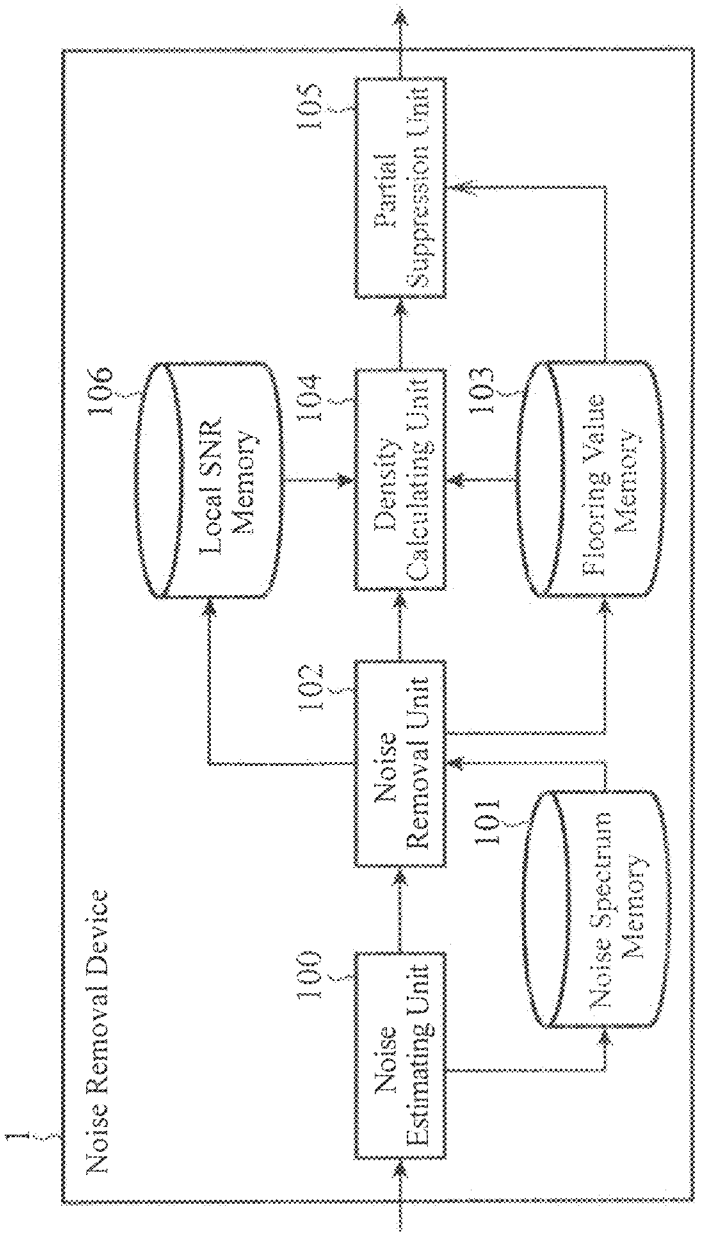
FIG. 10 is a block diagram showing a configuration of a noise removal device 1 of an embodiment 2 in accordance with the present invention.

FIG. 10 is a block diagram showing a configuration of the noise removal device 1 of an embodiment 2 in accordance with the present invention, in which the same or like components to those of FIG. 1 are designated by the same reference numerals and their description will be omitted. The noise removal device 1 shown in FIG. 10 has a configuration comprising a local SNR memory 106 newly added to the noise removal device 1 of FIG. 1.

The local SNR memory 106 is a storage unit for storing a frame number t the noise removal unit 102 outputs and the value of a local SNR (signal-to-noise ratio) with a frequency number f (referred to as the local SNR value from now on).

In the spectrogram, a region where parts with high local SNR values are dense is very likely to be a voice component, whereas the remaining region is very likely to be a noise component. Accordingly, whether it is a musical noise component or not can be discriminated by calculating the density of the local SNR values and by deciding on whether the parts with the high local SNR values are dense or not.

Next, the operation of the noise removal device 1 will be described. Incidentally, the operation of the noise removal unit 102, local SNR memory 106 and density calculating unit 104 will be described here, and the description of the operation of the remaining components will be omitted because it is the same as that of the foregoing embodiment 1.

Figure 11:
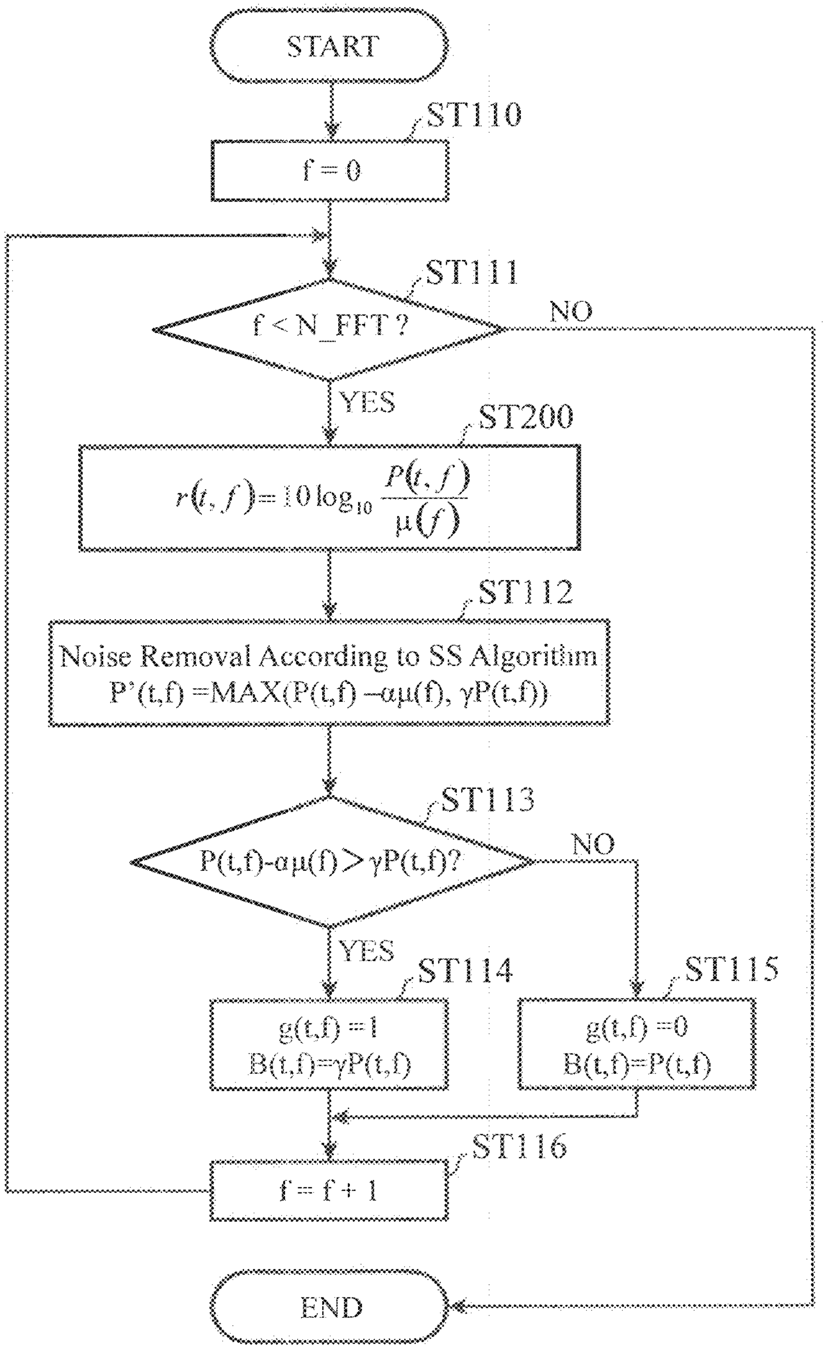
FIG. 11 is a flowchart showing the operation of the noise removal unit 102 shown in FIG. 10.

FIG. 11 is a flowchart showing the operation of the noise removal unit 102 shown in FIG. 10. In FIG. 11, as for the same or like operation steps (steps ST110-ST116) to those of FIG. 3 of the foregoing embodiment 1, they are designated by the same reference symbols and their description will be omitted. In the noise removal unit 102, its operation differs from the foregoing embodiment 1 in that at step ST200 it calculates a local SNR value r(t,f) with a frame number t and frequency number f according to the following Expression (17) and stores it in the local SNR memory 106.

$$r(t, f) = 10\log_{10}\frac{P(t, f)}{\mu(f)} \tag{17}$$

where P(t,f) is the power spectrum with the frame number t and frequency number f, and μ(f) is the mean value of the estimated noise spectrum with the frequency number f.

Figure 12:
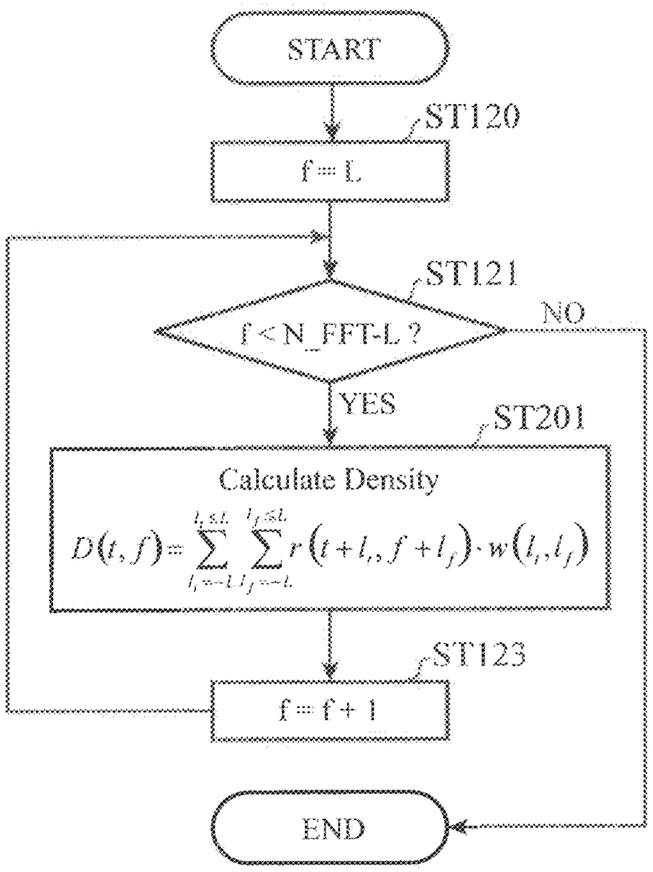
FIG. 12 is a flowchart showing the operation of the density calculating unit 104 shown in FIG. 10.

Next, the operation of the density calculating unit 104 will be described. FIG. 12 is a flowchart showing the operation of the density calculating unit 104 shown in FIG. 10. It differs from that of the foregoing embodiment 1 in that at step ST201 it acquires the local SNR values r(t,f) from the local SNR memory 106 and calculates the density D(t,f) of the local SNR values of the individual points around the point of interest according to the following Expression (18). The partial suppression unit 105 in the following state compares the density D(t,f) with the threshold $TH_D$, and makes a decision of a voice component when the density D(t,f) is not less than the threshold $TH_D$ (that is, a region where parts with high local SNR values are dense), and a decision of a musical noise component when it is less than the threshold $TH_D$.

$$D(t, f) = \sum_{l_t=-L}^{l_t \le L} \sum_{l_f=-L}^{l_f \le L} r(t + l_t, f + l_f) \cdot w(l_t, l_f) \tag{18}$$

where $w(l_t,l_f)$ is a weight function for the density calculation as in the foregoing Expression (15), L is the neighborhood number, and $l_t$ and $l_f$ are an index indicating the position from the center point (that is, the point of interest). As the weight function, various functions are applicable depending on purposes or operating environments as in the foregoing embodiment 1.

In addition, it goes without saying that a method of binarizing the local SNR value r(t,f) to 1 when it is not less than a particular reference value and to 0 when it is less than the particular reference value, followed by calculating the density D(t,f) according to the foregoing Expression (18) is within the scope of the present invention.

As described above, according to the embodiment 2, the noise removal device 1 is configured in such a manner that it newly comprises the local SNR memory 106 for retaining the local SNR values of a single frequency component with the frame number t and frequency number f, that the density calculating unit 104 calculates, as to the point of interest on the time-frequency plane of the input signal from which the noise is removed, the density of the local SNR values of the individual points around the point of interest, and that the partial suppression unit 105 replaces the power of the point of interest with the flooring value the noise removal unit 102 uses in the flooring processing when the density of the point of interest is less than the threshold. As a result, as the foregoing embodiment 1, the present embodiment 2 can appropriately discriminate and suppress the musical noise component even when the power fluctuations of noise are large and hence the power fluctuations of the under-subtraction component are large. In addition, by suppressing the musical noise component using the flooring value, it can prevent the temporal discontinuity from occurring in the signal.

Embodiment 3

Figure 13:
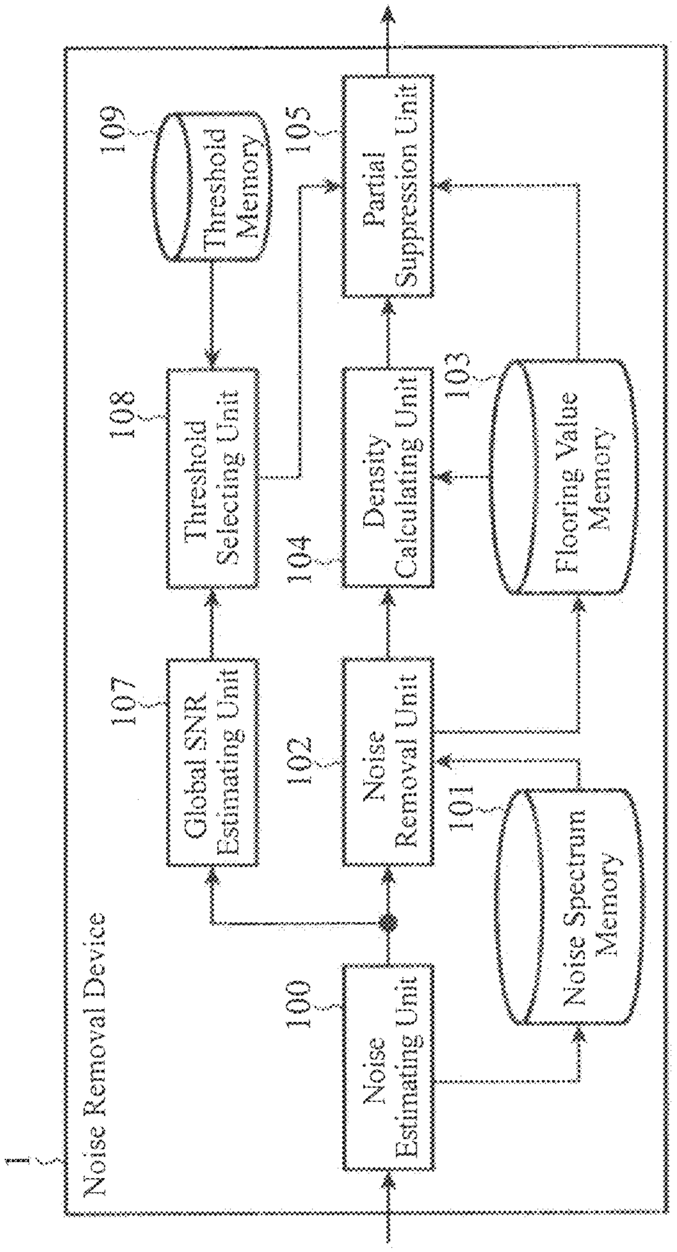
FIG. 13 is a block diagram showing a configuration of a noise removal device 1 of an embodiment 3 in accordance with the present invention.

FIG. 13 is a block diagram showing a configuration of the noise removal device 1 of an embodiment 3 in accordance with the present invention, in which the same or like components to those of FIG. 1 are designated by the same reference numerals and their description will be omitted. The noise removal device 1 shown in FIG. 13 has a configuration comprising a global SNR estimating unit 107, a threshold selecting unit 108 and a threshold memory 109 newly added to the noise removal device 1 of FIG. 1.

The global SNR estimating unit 107 estimates a global SNR of the input signal and supplies it to the threshold selecting unit 108.

Here, the difference between the global SNR and the local SNR described in the foregoing embodiment 2 will be described. Although the local SNR is an SNR calculated from the single frequency component as shown in the foregoing Expression (17), the global SNR is an SNR of the entire input signal calculated from a plurality of frequency components (or prescribed upper and lower limit frequency components).

The threshold memory 109 is a storage unit for storing a global SNR-threshold correspondence table that determines correspondence between the global SNR and threshold. The threshold selecting unit 108 selects the threshold corresponding to the global SNR estimate the global SNR estimating unit 107 outputs by referring to the global SNR-threshold correspondence table of the threshold memory 109. Incidentally, the global SNR-threshold correspondence table has been prepared for each global SNR by determining thresholds that will give optimum discriminating performance in the partial suppression unit 105 by using data for learning in advance.

The threshold the threshold selecting unit 108 selects is supplied to the partial suppression unit 105 and the partial suppression unit 105 uses as the threshold $TH_D$.

Next, the operation of the noise removal device 1 will be described. Incidentally, the operation of the global SNR estimating unit 107 and threshold selecting unit 108 will be described here, and the operation of the remaining portion will be omitted because it is the same as that of the foregoing embodiment 1.

Figure 14:
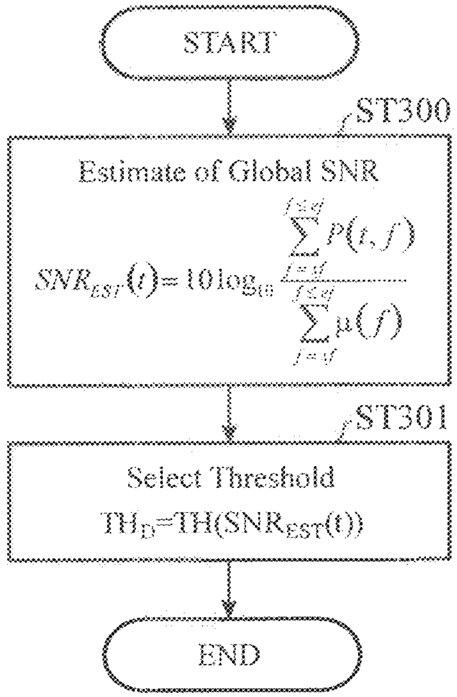
FIG. 14 is a flowchart showing the operation of the global SNR estimating unit 107 and threshold selecting unit 108 shown in FIG. 13.

FIG. 14 is a flowchart showing the operation of the global SNR estimating unit 107 and threshold selecting unit 108 shown in FIG. 13. First, the global SNR estimating unit 107 calculates a global SNR estimate $SNR_{EST}(t)$ at step ST300 according to the following Expression (19).

$$SNR_{EST}(t) = 10\log_{10}\frac{\sum_{f=sf}^{f\le ef} P(t,f)}{\sum_{f=sf}^{f\le ef} \mu(f)} \tag{19}$$

where sf is the lower limit frequency number used for the global SNR estimate calculation and of is the upper limit frequency number used for the global SNR estimate calculation.

Subsequently, referring to the global SNR-threshold correspondence table in the threshold memory 109 at step ST301, the threshold selecting unit 108 selects the threshold $TH(SNR_{EST}(t))$ corresponding to the global SNR estimate $SNR_{EST}(t)$ the global SNR estimating unit 107 estimates, and substitutes it into the threshold $TH_D$.

FIG. 15 shows an example of the global SNR-threshold correspondence table the threshold memory 109 stores. The table stores thresholds corresponding to the individual global SNR estimates. In this example, to prevent mis-suppression of a voice part, the threshold is reduced as the global SNR estimate increases. In addition, when the global SNR estimate is not less than 20, a voice component is considered to be completely superior to noise in the input signal and a negative threshold is set to prevent the partial suppression unit 105 from executing the partial suppression processing. On the other hand, to prevent a failure to suppress the musical noise component, the threshold is increased as the global SNR estimate reduces.

According to the foregoing processing, the threshold $TH_D$ used for the partial suppression processing by the partial suppression unit 105 is determined.

As described above, according to the embodiment 3, the noise removal device 1 is configured in such a manner that it comprises the global SNR estimating unit 107 for estimating a global SNR of the input signal, the threshold memory 109 for retaining the thresholds corresponding to the global SNR estimates, and the threshold selecting unit 108 for selecting from the threshold memory 109 the threshold corresponding to the global SNR estimate the global SNR estimating unit 107 estimates, and that the partial suppression unit 105 makes a decision on whether to substitute the flooring value for the musical noise component by using the threshold the threshold selecting unit 108 selects. As a result, it can select the optimum threshold in accordance with the global SNR estimate of the input signal. Accordingly, it can prevent a failure to suppress the musical noise when the global SNR estimate is low and the mis-suppression of a voice component when the global SNR estimate is high, thereby being able to suppress the musical noise correctly.

Incidentally, although the example of applying the embodiment 3 to the embodiment 1 is described above, it is not limited to the example, but is also applicable to the embodiment 2.

Embodiment 4

Although the noise removal device 1 of the embodiment 3 is configured in such a manner as to select the optimum threshold $TH_D$ in accordance with the global SNR estimate, the noise removal device 1 of the present embodiment 4 is configured in such a manner as to select optimum values corresponding to the global SNR estimate with respect to the weight function $w(l_t,l_f)$ and neighborhood number L at the density calculation.

Figure 16:
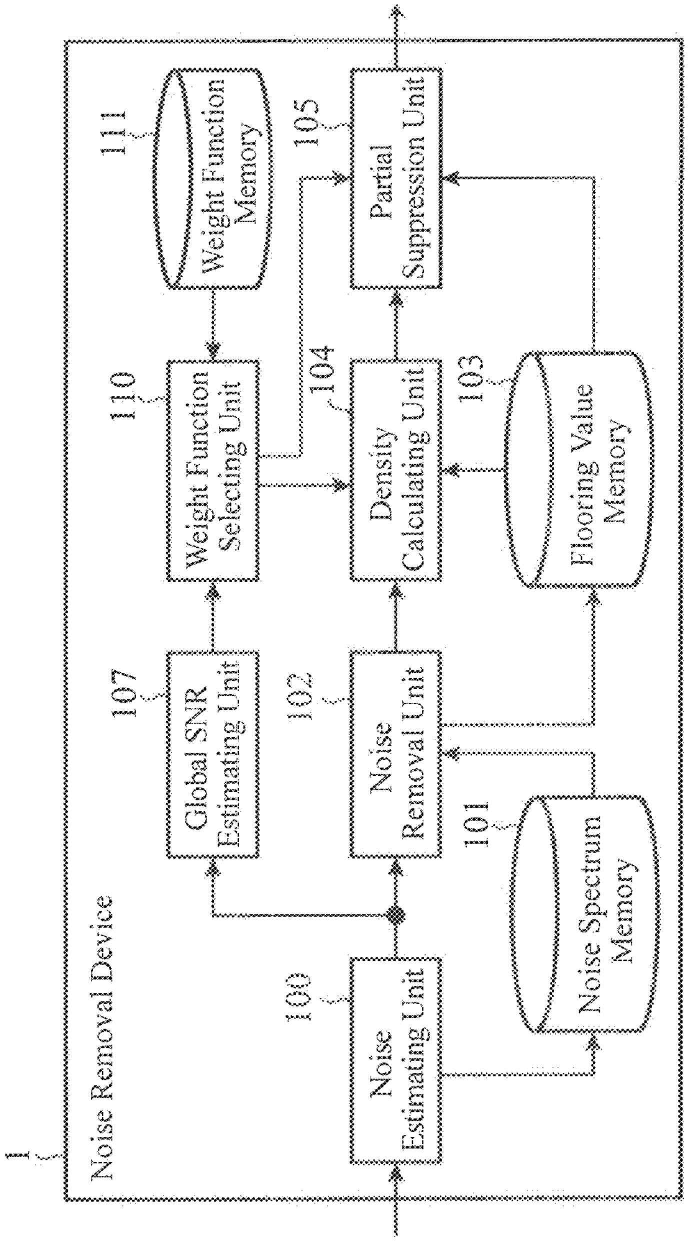
FIG. 16 is a block diagram showing a configuration of a noise removal device 1 of an embodiment 4 in accordance with the present invention.

FIG. 16 is a block diagram showing a configuration of the noise removal device 1 of the embodiment 4 in accordance with the present invention, in which the same or like components to those of FIG. 1 and FIG. 13 are designated by the same reference numerals and their description will be omitted. The noise removal device 1 shown in FIG. 16 has a configuration that comprises a weight function selecting unit 110 and a weight function memory 111 newly added to the noise removal device 1 of FIG. 1 and FIG. 13.

Referring to a global SNR-neighborhood number-weight function-threshold correspondence table in the weight function memory 111, the weight function selecting unit 110 selects the neighborhood number, weight function and threshold corresponding to the global SNR estimate the global SNR estimating unit 107 outputs. The weight function memory 111 is a storage unit for storing the global SNR-neighborhood number-weight function-threshold correspondence table, and the table is prepared in advance by determining, using data for learning, the neighborhood number, weight function and threshold, which will provide the optimum discriminating performance to the density calculating unit 104 and partial suppression unit 105, for each global SNR.

Next, the operation of the noise removal device 1 will be described. Incidentally, the operation of the weight function selecting unit 110 will be described here, and as for the operation of the remaining portions, since it is the same as that of the foregoing embodiments 1 and 3, its description will be omitted.

Figure 17:
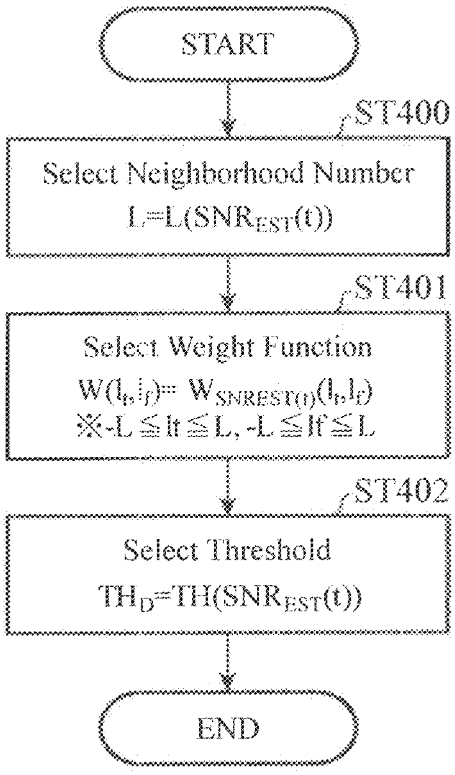
FIG. 17 is a flowchart showing the operation of the weight function selecting unit 110 shown in FIG. 16.

FIG. 17 is a flowchart showing the operation of the weight function selecting unit 110 shown in FIG. 16. Referring to the global SNR-neighborhood number-weight function-threshold correspondence table in the weight function memory 111 at step ST400, the weight function selecting unit 110 selects the neighborhood number $L(SNR_{EST}(t))$ corresponding to the global SNR estimate $SNR_{EST}(t)$ the global SNR estimating unit 107 estimates, and substitutes it for the neighborhood number L.

Subsequently, the weight function selecting unit 110 selects at step ST401 the weight function $W_{SNREST(t)}(l_t,l_f)$ corresponding to the global SNR estimate $SNR_{EST}(t)$, and substitutes it for the weight function $W(l_t,l_f)$. Here, it is assumed that $-L\le l_t\le L$, $-L\le l_f\le L$.

Subsequently, the weight function selecting unit 110 selects at step ST402 the threshold $TH(SNR_{EST}(t))$ corresponding to the global SNR estimate $SNR_{EST}(t)$, and substitutes it for the threshold $TH_D$.

FIG. 18 shows an example of the global SNR-neighborhood number-weight function-threshold correspondence table the weight function memory 111 stores. The table stores the neighborhood number, weight function and threshold corresponding to each global SNR estimate. In this example, the density calculating unit 104 alters the neighborhood number and weight function in accordance with the global SNR estimate so as to emphasize more global information when the global SNR estimate is low, but to emphasize in contrast more local information when the global SNR estimate is high, thereby trying to improve the discriminating accuracy of the musical noise component by the partial suppression unit 105. In addition, when the global SNR estimate is not less than 20, it considers that the voice component is completely superior to noise in the input signal and sets a negative threshold, thereby preventing the partial suppression unit 105 from executing the partial suppression processing. On the other hand, to prevent a failure to suppress the musical noise component, it increases the threshold as the global SNR estimate reduces.

Through the foregoing processing, the neighborhood number L and weight function $w(l_t,l_f)$ the density calculating unit 104 uses for the density calculation processing and the threshold $TH_D$ the partial suppression unit 105 uses for the partial suppression processing are decided.

As described above, according to the embodiment 4, the noise removal device 1 has a configuration that comprises the global SNR estimating unit 107 for estimating the global SNR of the input signal, the weight function memory 111 for retaining the weight functions and thresholds each corresponding to the global SNR estimate, and the weight function selecting unit 110 for selecting from the weight function memory 111 the weight function and threshold corresponding to the global SNR estimate the global SNR estimating unit 107 estimates, in which the density calculating unit 104 assigns a weight to the flag indicating the presence or absence of the flooring using the weight function the weight function selecting unit 110 selects, and the partial suppression unit 105 decides whether to substitute the flooring value for the musical noise component or not using the threshold the weight function selecting unit 110 selects. Thus, it can select the optimum neighborhood number and weight function in accordance with the global SNR estimate of the input signal. Accordingly, it can make a decision of the musical noise component by emphasizing the more global information when the global SNR estimate is low and by emphasizing the more local information when the global SNR estimate is high, thereby being able to improve the discriminating accuracy. In addition, as for the effect of using the threshold, it is the same as described in the foregoing embodiment 3.

Incidentally, although the example of applying the embodiment 4 to the embodiment 3 is described above, it is not limited to the example, but is applicable to the embodiment 2 as well.

In addition, a configuration is also possible in which the weight function selecting unit 110 selects only the weight function and the density calculating unit 104 assigns weights to the flags indicating the presence or absence of the flooring using the weight function. In this case, as for the threshold the partial suppression unit 105 uses for making decision of the musical noise component, it can be any given value.

Industrial Applicability

Although the noise removal devices of the foregoing embodiments 1-4 are not limited to any particular purposes, they are particularly useful for improving the voice recognition performance or telephone conversation quality under a noisy environment in apparatuses such as a car navigation system, cellular phone and information terminal.

What is claimed is:

1. A noise removal device comprising:

a noise estimating unit for estimating noise superposed on an input signal;

a noise removal unit for eliminating the noise superposed on the input signal and for executing flooring processing by using statistics of the noise the noise estimating unit estimates;

a density calculating unit for calculating, with respect to a point of interest on a time-frequency plane of the input signal from which the noise is removed, a designated density of individual points around the point of interest; and a partial suppression unit for replacing, when the density with respect to the point of interest on the time-frequency plane is less than a threshold, the power of the point of interest with a flooring value the noise removal unit uses in the flooring processing.

2. The noise removal device according to claim 1, wherein the density calculating unit calculates the density of non-flooring processing points from the presence or absence of the flooring processing in the noise removal unit as to the individual points around the point of interest.

3. The noise removal device according to claim 2, wherein the density calculating unit calculates the density by using values obtained by binarizing the presence or absence of the flooring processing around the point of interest, followed by assigning weights using a weight function.

4. The noise removal device according to claim 3, further comprising:

a global SNR estimating unit for estimating a global SNR of a plurality of frequency components of the input signal;

a weight function storage unit for retaining a weight function corresponding to the global SNR; and a weight function selecting unit for selecting from the weight function storage unit the weight function corresponding to the global SNR the global SNR estimating unit estimates, wherein the density calculating unit uses the weight function the weight function selecting unit selects.

5. The noise removal device according to claim 3, wherein the weight function alters its weights in accordance with a distance from the point of interest on the time-frequency plane.

6. The noise removal device according to claim 1, wherein the density calculating unit calculates the density of local SNRs (signal-to-noise ratios) of a single frequency component of the individual points around the point of interest.

7. The noise removal device according to claim 6, wherein the density calculating unit calculates the density by using values obtained by assigning weights to local SNRs of the individual points around the point of interest using a weight function.

8. The noise removal device according to claim 7, further comprising:

a global SNR estimating unit for estimating a global SNR of a plurality of frequency components of the input signal;

a weight function storage unit for retaining a weight function corresponding to the global SNR; and a weight function selecting unit for selecting from the weight function storage unit the weight function corresponding to the global SNR the global SNR estimating unit estimates, wherein the density calculating unit uses the weight function the weight function selecting unit selects.

9. The noise removal device according to claim 7, wherein the weight function alters its weights in accordance with a distance from the point of interest on the time-frequency plane.

10. The noise removal device according to claim 1, further comprising:

a global SNR estimating unit for estimating a global SNR of a plurality of frequency components of the input signal;

a threshold storage unit for retaining a threshold corresponding to the global SNR; and a threshold selecting unit for selecting from the threshold storage unit the threshold corresponding to the global SNR the global SNR estimating unit estimates, wherein the partial suppression unit uses the threshold the threshold selecting unit selects.

11. A non-transitory computer readable medium comprising noise removal program for causing a computer to execute:

a noise estimating step of estimating noise superposed on an input signal;

a noise removal step of eliminating the noise superposed on the input signal and for executing flooring processing by using statistics of the noise the noise estimating step estimates;

a density calculating step of calculating, with respect to a point of interest on a time-frequency plane of the input signal from which the noise is removed, a designated density of individual points around the point of interest; and a partial suppression step of replacing, when the density with respect to the point of interest on the time-frequency plane is less than a threshold, the power of the point of interest with a flooring value the noise removal step uses in the flooring processing.

12. The non-transitory computer readable medium according to claim 11, wherein the density calculating step calculates the density of non-flooring processing points from the presence or absence of the flooring processing in the noise removal step as to the individual points around the point of interest.

13. The non-transitory computer readable medium according to claim 12, wherein the density calculating step calculates the density by using values obtained by binarizing the presence or absence of the flooring processing around the point of interest, followed by assigning weights using a weight function.

14. The non-transitory computer readable medium according to claim 13, further causing the computer to execute:

a global SNR estimating step of estimating a global SNR of a plurality of frequency components of the input signal;

a weight function storage step of retaining a weight function corresponding to the global SNR; and a weight function selecting step of selecting from the weight function storage step the weight function corresponding to the global SNR the global SNR estimating step estimates, wherein the density calculating step uses the weight function the weight function selecting step selects.

15. The non-transitory computer readable medium according to claim 13, wherein the weight function alters its weights in accordance with a distance from the point of interest on the time-frequency plane.

16. The non-transitory computer readable medium according to claim 11, wherein the density calculating step calculates the density of local SNRs (signal-to-noise ratios) of a single frequency component of the individual points around the point of interest.

17. The non-transitory computer readable medium according to claim 16, wherein the density calculating step calculates the density by using values obtained by assigning weights to local SNRs of the individual points around the point of interest using a weight function.

18. The non-transitory computer readable medium according to claim 17, further causing the computer to execute:

a global SNR estimating step of estimating a global SNR of a plurality of frequency components of the input signal;

a weight function storage step of retaining a weight function corresponding to the global SNR; and a weight function selecting step of selecting from the weight function storage step the weight function corresponding to the global SNR the global SNR estimating step estimates, wherein the density calculating step uses the weight function the weight function selecting step selects.

19. The non-transitory computer readable medium according to claim 17, wherein the weight function alters its weights in accordance with a distance from the point of interest on the time-frequency plane.

20. The non-transitory computer readable medium according to claim 11, further causing the computer to execute:

a global SNR estimating step of estimating a global SNR of a plurality of frequency components of the input signal;

a threshold storage step of retaining a threshold corresponding to the global SNR; and a threshold selecting step of selecting from the threshold storage step the threshold corresponding to the global SNR the global SNR estimating step estimates, wherein the partial suppression step uses the threshold the threshold selecting step selects.

* * * * *